July 19, 1927.

F. S. BUSSELL 1,636,283

AUTOMATIC ADJUSTING END THRUST BEARING

Filed Dec. 1, 1925

*INVENTOR.*
FREDDIE S. BUSSELL.

BY

*ATTORNEYS.*

Patented July 19, 1927.

1,636,283

UNITED STATES PATENT OFFICE.

FREDDIE S. BUSSELL, OF INDIANAPOLIS, INDIANA.

AUTOMATIC ADJUSTING END-THRUST BEARING.

Application filed December 1, 1925. Serial No. 72,485.

This invention relates to an end thrust bearing.

The chief object of the invention is to provide an end thrust bearing for a shaft which is adjustable for taking up the line play between the shaft and bearings, and which furthermore is automatically adjustable within the range of its adjustability.

The chief feature of the invention consists in the formation of an adjustable end thrust bearing from a minimum number of parts readily interposed between the shaft and the bearing supporting the same for maintaining the shaft in a predetermined position with respect to the bearing and automatically adjusting itself as the wear or play increases.

Figure 1:
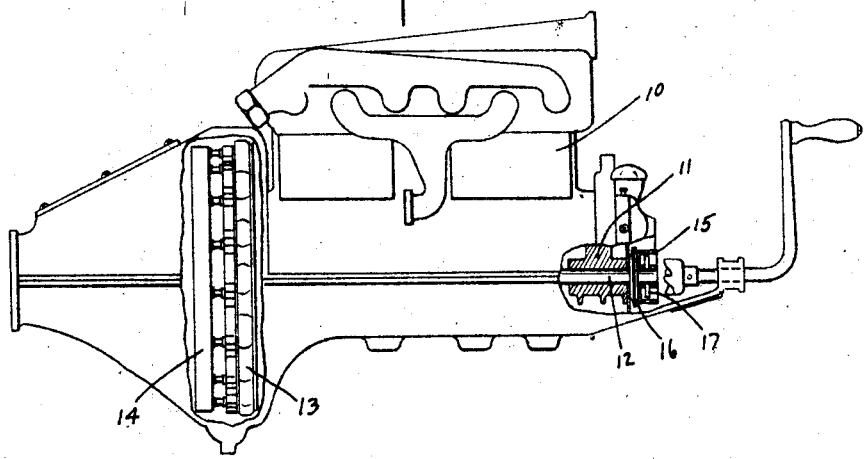
Figure 2:
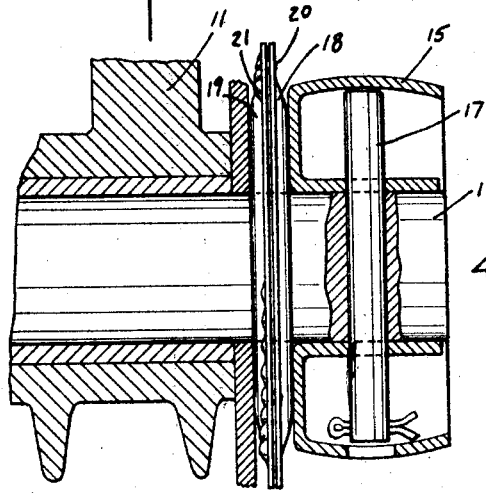
Figure 3:
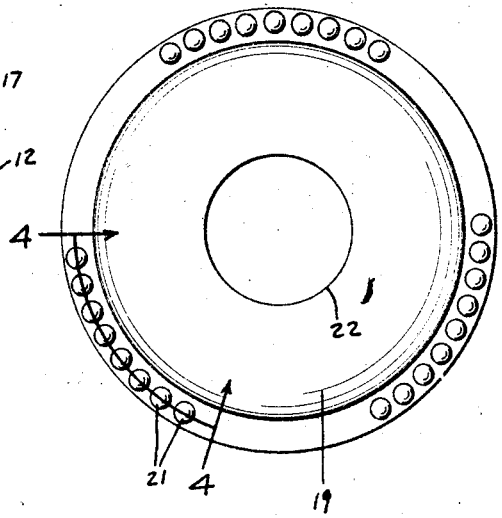
Figure 4:
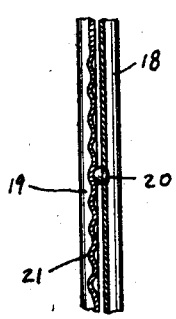

The full nature of the invention will be understood from the accompanying drawings and the following description and claims:

In the drawings Fig. 1 is a side elevational view of an internal combustion engine conventionally illustrated as of the Ford engine type, with parts broken away to show parts of the invention in elevation. Fig. 2 is an enlarged central sectional view of the invention mounted upon a shaft and in operative position with respect to a bearing therefor. Fig. 3 is an elevational view of the device. Fig. 4 is a sectional view taken along the arcuate line 4—4 of Fig. 3 and in the direction of the arrows.

In the drawings 10 indicates an internal combustion engine of the Ford type having a forward bearing 11 and a crankshaft 12 mounted therein. Upon the rear end of the crankshaft is mounted the complementary fly-wheel magneto parts and the stationary complements therefor indicated generally by the numerals 13 and 14. It is to be understood that in this type of engine the rotating and stationary parts generate the electromotive force for the engine to operate and require a predetermined clearance between the same, which clearance must be sufficient for mechanical movement of the parts, but which must not exceed a predetermined amount to secure electrical operation of the magneto device. As the crankshaft wears in the bearing it acquires more play or clearance and this means that at certain times the clearance between the two magneto parts is such that the magneto does not operate as such. The present device, therefore, consists of an adjustable end thrust bearing for maintaining the crankshaft in predetermined relation at all times and which is automatically self adjusting within the range of its adjustability.

Positioned upon the forward end of the crankshaft beyond the bearing 11 is a pulley 15 secured by a crank engageable pin 17. This is the customary Ford construction. The thrust bearing is interposed between pulley 15 and bearing 11.

The device consists of two circular plates centrally apertured as at 22 and complementarily formed. The plate 18 is herein shown provided with a peripheral flange from which projects and upon which is secured the cam buttons or elements 20 preferably semi-spherical in shape. The plate 19 is similar to the plate 18 and its flanged periphery is provided with a plurality of series of notches or recesses, each of which progresses from the one of greater depth to the one of lesser depth in the series. The button 20 when positioned in the recess 21 of greatest depth permits the two peripheral flanges of the plates 18 and 19 to engage or abut. These plates, being somewhat resilient, are held so they have relative movement until a predetermined condition arises. Plate 19 is held stationary by bearing against the bearing 11. In rotation of the crankshaft 12 plate 18 rotates until abutment 20 seats in the recess 21 corresponding to the maximum clearance or play between the bearing 11 and crankshaft. Thereafter the crankshaft will be maintained in the adjusted position and be prevented from having end play. As the bearing wears and additional end play occurs the abutment 20 progresses from the recess of greater depth to the recess of lesser depth and automatically in the rotation of said crankshaft until the last recess has been occupied by the abutment, whereupon a larger size of end thrust bearing must be employed or a new main bearing for the shaft must be provided.

Herein three series of recesses are provided and three abutments, the same being arranged in spaced relation.

The invention claimed is:

1. An automatically adjustable end thrust bearing comprising but a pair of similar plates having complementary peripheral portions, one peripheral portion including an abutment, and the other peripheral portion including progressively deepening series of recesses.

2. A device as defined by claim 1 characterized by one plate including a plurality of abutments and the other including a plurality of said series of recesses, said recesses being arranged whereby each abutment is receivable by a recess.

3. A device as defined by claim 1 characterized by one plate including a plurality of abutments and the other including a plurality of said series of recesses, said recesses being arranged whereby each abutment is receivable by a recess, said abutments and said series of recesses being arranged in spaced relation.

In witness whereof, I have hereunto affixed my signature.

FREDDIE S. BUSSELL.